(12) United States Patent
Namuduri et al.

(10) Patent No.: US 9,452,672 B2
(45) Date of Patent: Sep. 27, 2016

(54) VEHICLE POWERTRAIN

(71) Applicant: GM GLOBAL TECHNOLOGY OPERATIONS LLC, Detroit, MI (US)

(72) Inventors: Chandra S. Namuduri, Troy, MI (US); Michael G. Reynolds, Troy, MI (US); David W. Walters, Sterling Heights, MI (US); Suresh Gopalakrishnan, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/585,641

(22) Filed: Dec. 30, 2014

(65) Prior Publication Data

US 2016/0185205 A1 Jun. 30, 2016

(51) Int. Cl.
*B60K 6/28* (2007.10)
*F02N 11/04* (2006.01)
*F02N 11/08* (2006.01)

(52) U.S. Cl.
CPC .............. *B60K 6/28* (2013.01); *F02N 11/04* (2013.01); *F02N 11/087* (2013.01); *Y10S 903/903* (2013.01)

(58) Field of Classification Search
CPC ........ B60K 6/485; B60K 6/26; B60K 6/365; B60K 6/28
See application file for complete search history.

(56) References Cited

U.S. PATENT DOCUMENTS

| 6,769,389 | B2* | 8/2004 | Tamai | B60K 6/485 123/179.3 |
| 6,909,201 | B2* | 6/2005 | Murty | H02J 7/1423 307/10.1 |
| 7,267,090 | B2* | 9/2007 | Tamai | B60L 11/1868 123/179.3 |
| 7,766,788 | B2* | 8/2010 | Shamoto | B60K 6/365 477/3 |
| 8,498,767 | B2* | 7/2013 | Kotani | H02J 1/00 318/139 |
| 9,108,633 | B1* | 8/2015 | Atluri | B60W 20/10 |
| 2010/0025131 | A1* | 2/2010 | Gloceri | B60G 3/20 180/65.28 |
| 2010/0244459 | A1* | 9/2010 | Gibson | F02N 11/0866 290/38 R |
| 2011/0034282 | A1* | 2/2011 | Akutsu | B60K 6/26 475/5 |
| 2012/0259490 | A1* | 10/2012 | Yang | B60K 6/365 701/22 |
| 2013/0066492 | A1* | 3/2013 | Holmes | B60W 20/00 701/22 |

FOREIGN PATENT DOCUMENTS

| DE | 4028242 A1 | 3/1992 |
| DE | 19842657 A1 | 3/2000 |
| DE | 10014243 A1 | 10/2001 |
| DE | 102012000624 A1 | 7/2013 |

* cited by examiner

*Primary Examiner* — Hau Phan
(74) *Attorney, Agent, or Firm* — Quinn Law Group, PLLC

(57) ABSTRACT

A powertrain includes an engine and an electrical circuit having a motor-generator and a starter mechanism coupled to the engine. A first energy storage device is disposed in a parallel electrical relationship with the starter mechanism. A second energy storage device is disposed in a parallel electrical relationship with the motor-generator. A first auxiliary electric system is disposed in a parallel electrical relationship with both the first energy storage device and the second energy storage device. A first switch is disposed within the electrical circuit between the first energy storage device and the first auxiliary electric system. A second switch is disposed within the electrical circuit between the second energy storage device and the first auxiliary electric system. The first auxiliary electric system is disposed, within the electrical circuit, between the first switch and the second switch.

30 Claims, 2 Drawing Sheets

VEHICLE POWERTRAIN

TECHNICAL FIELD

The disclosure generally relates to a powertrain for a vehicle.

BACKGROUND

Vehicles with an electrified powertrain include an internal combustion engine that is used as a primary driver of the vehicle, and incorporate at least one electric motor-generator to either generate electrical power from torque provided from the engine when the engine is producing excess torque, or provide additional torque to the engine to assist the engine when the engine requires additional torque production.

Vehicles with an electrified powertrain tend to be either a single voltage system, or a dual voltage system. Vehicles with an electrified powertrain using the single voltage system generally rely on a single high-power energy storage device (generally at a nominal 12 volts) to provide electrical energy for accessory loads when the engine is off, engine cranking for starting, engine torque addition, etc. The single high-power energy storage device also absorbs electrical energy from the motor-generator when the vehicle is braking or when the motor-generator is providing more electrical power than the accessory loads require. Vehicles with an electrified powertrain using the dual voltage system generally rely on two different energy storage devices. The primary or cranking energy storage device is nominally a 12 volt device, and is used to provide energy for loads during key-off situations. The cranking energy storage device is also used to provide energy during starting events. The second energy storage device is typically of a higher voltage, and is generally charged by the motor-generator at the higher voltage. A dc-dc converter is required to transfer energy from the higher voltage energy storage device and/or the motor generator to the lower voltage (e.g., 12 volt) cranking energy storage device and/or to the accessory loads.

SUMMARY

A powertrain for a vehicle is provided. The powertrain includes an engine and an electrical circuit. The electrical circuit includes a motor-generator coupled to the engine. The motor-generator is operable as either a motor to provide power to the engine, or as a generator to generate an electrical current from power supplied from the engine. A starter mechanism is also coupled to the engine, and is operable to start the engine in response to a cranking current. A first energy storage device (ESD) is disposed in a parallel electrical relationship with the starter mechanism. The first energy storage device is operable to supply the cranking current to the starter mechanism. A second energy storage device is disposed in a parallel electrical relationship with the motor-generator. The second energy storage device is operable to receive an electrical current from the motor-generator, or provide an electrical current to the motor-generator. A first auxiliary electric system is disposed in a parallel electrical relationship with both the first energy storage device and the second energy storage device. A first switch is disposed within the electrical circuit between the first energy storage device and the first auxiliary electric system. A second switch is disposed within the electrical circuit between the second energy storage device and the first auxiliary electric system. The first auxiliary electric system is disposed, within the electrical circuit, between the first switch and the second switch.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Referring to the Figures, wherein like numerals indicate like parts throughout the several views, a powertrain is generally shown at 20. The powertrain 20 is for a vehicle. The vehicle may include, but is not limited to, an automotive vehicle, such as, a car, a truck, etc., or a non-automotive vehicle, such as, a farm vehicle, a marine vehicle, an aviation vehicle, etc.

Figure 1:
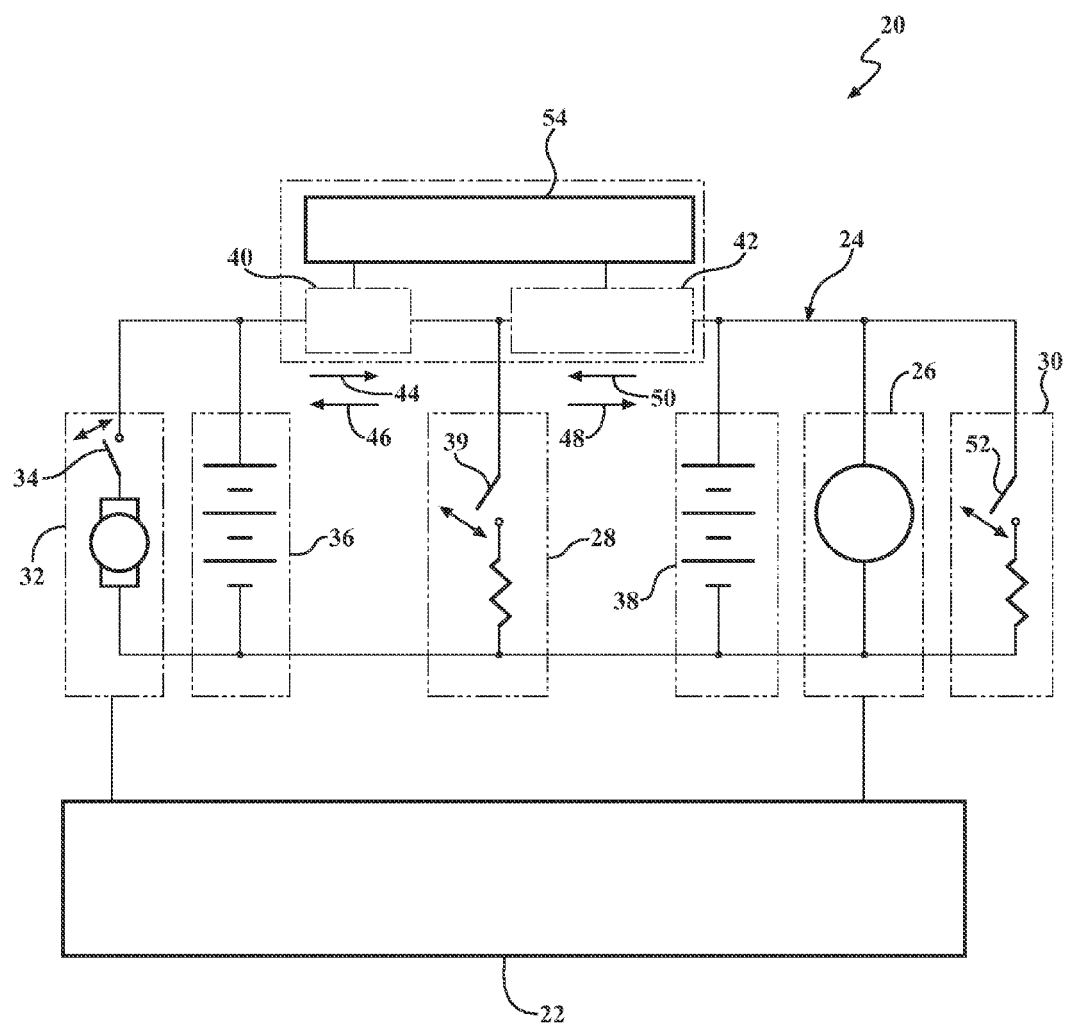
FIG. 1 is a schematic diagram of a powertrain for a mild hybrid vehicle.

Referring to FIG. 1, the powertrain 20 includes an engine 22. The engine 22 is preferably the prime mover of the vehicle. The engine 22 may include an internal combustion engine 22, such as but not limited to, a gasoline engine 22, a diesel engine 22, a propane engine 22, etc. The engine 22 operates as is known in the art to generate torque through combustion of fuel. The torque is transferred to one or more drive wheels through a transmission as is known. The specific type, style, configuration, and/or size of the engine 22 is not pertinent to the teachings of the disclosure, and are therefore not described in detail herein.

The powertrain 20 further includes an electrical circuit 24. The electrical circuit 24 includes various components, connected together by wiring to form a path in which electrons from a voltage or current source may flow. Accordingly, as described herein, the electrical circuit 24 includes both the various electrical components, but also the wiring and/or connections required to connect the electrical components in the manner described below.

The electrical circuit 24 includes a motor-generator 26. The motor-generator 26 is coupled to the engine 22, and is operable as either a motor to provide power to the engine 22, or as a generator to generate an electrical current from power supplied from the engine 22. When operated as a motor, the motor-generator 26 assists the engine 22 in torque production to propel the vehicle. When operated as a generator, the motor-generator 26 may generate electricity to recharge an energy storage device, or to power one or more electrical components of a first auxiliary electric system 28 (described in greater detail below) or a second auxiliary electric system 30 (described in greater detail below).

The first auxiliary electric system 28 may contain at least one electrical load whose change in performance due to a predefined change in operating voltage is readily noticeable and may be unacceptable to the vehicle customer. Such loads are hereafter referred to as voltage-sensitive loads. The voltage variation across such loads during various operating conditions such as autostarts, energy recuperation and torque boost using the starter motor 32 and motor/generator 26, needs to be maintained within a predefined value to meet customer acceptable vehicle level performance. In addition, the first auxiliary electric system 28 may contain at least one electrical load which needs to be provided with uninterrupted electric power with the engine 22 off, in case one of the energy storage devices is unable to provide power for any reason. Those loads whose change in performance is not readily noticeable to the customer due to a voltage change exceeding a predefined value are hereafter referred to as non-voltage-sensitive loads. The second auxiliary electric system 30 consisting of non-voltage-sensitive loads, may be disposed in a parallel electrical relationship with both the second energy storage device 38 and the motor-generator 26.

The motor-generator 26 may include any device capable of being coupled to the engine 22, and operating as a motor to generate torque, or as a generator to generate electricity. For example, the motor-generator 26 may include, but is not limited to, a brushless electric motor-generator 26 or other similar device. The motor-generator 26 may be coupled to the engine 22 in any suitable manner. For example, the motor-generator 26 may be coupled to a crankshaft of the engine 22 via an endless belt to transmit torque between the crankshaft and the motor-generator 26. It should be appreciated that the motor-generator 26 may alternatively be coupled to the engine 22 in some other manner not shown or described herein.

Generally, the motor-generator 26 operates as a generator when the engine 22 is producing more torque than is required for the current operating conditions of the vehicle, and operates as a motor when the vehicle requires more torque than the engine 22 is currently producing. For example, the motor-generator 26 may operate as a motor when the vehicle is moving at a certain speed or accelerating, and is not braking/slowing down. Alternatively, the motor-generator 26 may operate as a generator when the vehicle is slowing down, braking, or is stopped.

The motor-generator 26 may include an integrated power inverter (not shown). The integrated power inverter is operable to convert direct current (DC) provided by an energy storage device to alternating current (AC) to power the motor-generator 26 as a motor. Additionally, the integrated power inverter is operable to convert AC to DC to be stored in an energy storage device when the motor-generator 26 functions as a generator. Additionally, the integrated power inverter can convert AC to DC to supply current to the first auxiliary electric system 28, or the second auxiliary electric system 30. The motor-generator 26 may include other electrical devices, such as one or more sensors (such as for example, a motor position sensor that detects the position of the motor/generator shaft, temperature, current and voltage sensors), controllers 54, thermal management components to cool the machine and the electrical components, etc.

The electrical circuit 24 further includes a starter mechanism 32. The starter mechanism 32 is coupled to the engine 22, and is operable to start the engine 22 from a cranking current. The starter mechanism 32 operates independently of the motor-generator 26 to selectively start the engine 22. As such, the motor-generator 26 does not assist the starter mechanism 32 when the starter mechanism 32 is engaged to start the engine 22. As such, the starter mechanism 32 is used exclusively to start the engine 22 for all starts. In other words, the starter mechanism 32 is used to make all first key-on starts as well as all auto-starts.

The starter mechanism 32 may include, but is not limited to, an electric starter motor that is selectively engaged to spin the crankshaft of the engine 22 in order to start the engine 22. The starter mechanism 32 may be coupled to the engine 22 in any suitable manner. For example, as is known in the art for electric starter motors, the starter mechanism 32 may be coupled to the engine 22 through meshing engagement of a starting gear (not shown) with a ring gear (not shown) that is attached to the crankshaft of the engine 22. Actuation of the electric starter motor moves the starting gear into meshing engagement with the ring gear and simultaneously spins the ring gear and thereby the crankshaft of the engine 22. The starter mechanism 32 may include a starting switch 34, such as but not limited to a solenoid or other similar device, to selectively connect and disconnect the starter mechanism 32 from the first energy storage device 36. It should be appreciated that the starter mechanism 32 may be configured in some other manner not described herein that is capable of starting the engine 22.

The electric circuit further includes a first energy storage device 36, and a second energy storage device 38. The first energy storage device 36 is disposed in a parallel electrical relationship with the starter mechanism 32, and is also disposed in a parallel electrical relationship with the first auxiliary electric system 28. The first energy storage device 36 is configured and is operable to supply the cranking current to the starter mechanism 32, necessary to start the engine 22, and/or may supply current to the first auxiliary electric system 28 and/or the second auxiliary electric system 30. The first energy storage device 36 may include any suitable battery or other device that can store sufficient energy for starting the engine 22. Preferably, the first energy storage device 36 is a lead acid battery, sized according to the specific needs of the starter mechanism 32. However, it should be appreciated that the first energy storage device 36 may include a device other than the lead acid battery noted above, such as an ultra-battery, ultra-capacitor, Li-Ion battery, Li-Ion Capacitor or a combination thereof.

The second energy storage device 38 is disposed in a parallel electrical relationship with the motor-generator 26, and also in a parallel electrical relationship with the first auxiliary electric system 28 and the second auxiliary electric system 30. The second energy storage device 38 is operable to receive a current from the motor-generator 26, or to provide a current to the motor generator, the first auxiliary electric system 28, or the second auxiliary electric system 30. Preferably, the second energy storage device 38 is one capable of high charging and discharging currents with high efficiency, such as a Li-Ion battery. However, it should be appreciated that the second energy storage device 38 may include any device that is capable of storing energy for later use, such as but not limited to some other type of battery, an ultra-capacitor, ultra-battery, Li-Ion Capacitor, some other similar device, or a combination thereof.

The first energy storage device 36 and the second energy storage device 38 may each operate at a substantially identical, nominal voltage. Preferably, the first energy storage device 36 and the second energy storage device 38 each operate nominally within a range of approximately 10 volts and 16 volts, i.e., a 12 volt system. However, it should be appreciated that the first energy storage device 36 and the second energy storage device 38 may be configured to operate at some other nominal voltage, such as but not limited to 6 volts, 24 volts, 48 volts, etc.

The first energy storage device 36 and the second energy storage device 38 may be significantly different in character, and include significantly different chemistries, but include a similar voltage under predetermined operating conditions. The first energy storage device 36 is intended to store energy for long durations of time and provide short bursts of power over a wide temperature range. The second energy storage device 38 is intended to store significantly less energy than the first energy storage device 36, but accept and deliver significantly more electrical power for short durations than the first energy storage device 36 is configured to do. The first energy storage device 36 is intended to be maintained at a relatively high state of charge, for example, between 80% and 95% state of charge, whereas the second energy storage device 38 is intended to be maintained at an intermediate state of charge for extended periods of time, for example, between 30% and 70% state of charge, so as to be ready to accept or provide power to and/or from the motor-generator 26.

The first energy storage device 36 is operable to store a first amount of charge and provide short bursts of power within a first amperage range over a first temperature range. The second energy storage device 38 is operable to store a second amount of charge and provide or accept short bursts of power at a second amperage over a second temperature range. The first amount of charge of the first energy storage device 36 is greater than the second amount of charge of the second energy storage device 38. The first amperage range of the first energy storage device 36 is greater than the second amperage range of the second energy storage device 38. The first temperature range over which the first energy storage device 36 is operable to provide power is greater than the second temperature range over which the second energy storage device 38 is operable to provide power.

For example, the first amount of charge of the first energy storage device 36 may be between 40 amp-hours and 85 amp-hours and the operating state of charge of the first energy storage device 36 may be between 80% and 95%, and the second amount of charge of the second energy storage device 38 may be between 10 amp-hours and 20 amp-hours and the operating state of charge of the second energy device may be between 30% and 70%. As used herein, state of charge (SOC) is defined as the percentage of a full charge of an energy storage device. As such, a 100% SOC is equal to a fully charged energy storage device. Similarly, a 50% SOC is equal to a half charged energy storage device. In a non-limiting case, a first amperage of the first energy saving device 36 during starting over a range of between −30° C. to 55° C. can be a minimum of 600 A, whereas a second amperage of the second energy saving device 38 during power assist or regeneration mode can be up to maximum of 400 A at temperatures between the range of −10° C. to 45° C.

The first energy storage device 36 and the second energy storage device 38 are selected so that, at a predetermined temperature (e.g., 25° C.), the first energy storage device 36 includes a first open circuit voltage at a first operating state of charge, and the second energy storage device 38 includes a second open circuit voltage at a second operating state of charge. The second open circuit voltage of the second energy storage device 38 at the second SOC is greater than the first open circuit voltage of the first energy storage device 36 at the first SOC.

For example, the second open circuit voltage of the second energy storage device 38 at a 50% SOC is at least 10 mV greater than the first open circuit voltage of the first energy storage device 36 at 90% SOC, and is no more than 1000 mV greater than the first open circuit voltage of the first energy storage device 36. The operating state of charge of the first energy storage device 36 is preferably between 80% and 95%. The operating state of charge of the second energy storage device 38 is preferably between 30% and 70%. It should be appreciated that the difference between the first open circuit voltage of the first energy storage device 36 and the second open circuit voltage of the second energy storage device 38, and the respective operating state of charge of each, may vary from the exemplary embodiment described above.

Figure 2:
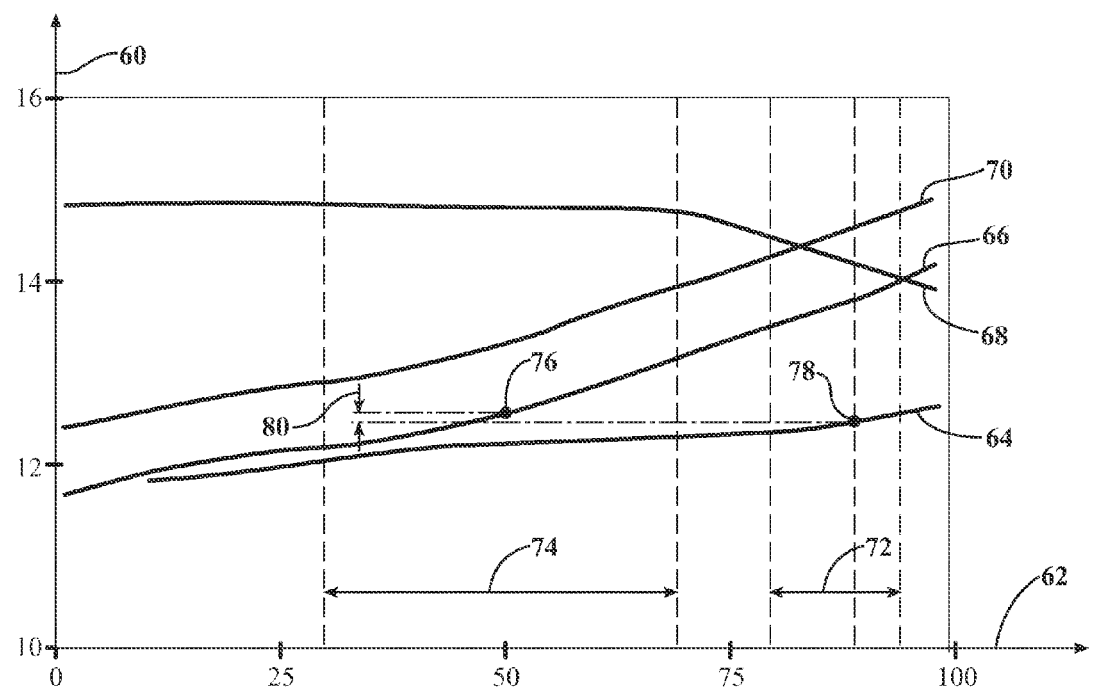
FIG. 2 is a graph showing the relationship between an open circuit voltage and a charging voltage of a first energy storage device and a second energy storage device.

The exemplary embodiment described immediately above is represented in FIG. 2. Referring to FIG. 2, a system voltage is shown along a vertical axis 60, and a state of charge is shown along a horizontal axis 62. The first open circuit voltage of the first energy storage device 36 is represented by line 64, and the second open circuit voltage of the second energy storage device 38 is represented by line 66. A charging voltage of the first energy storage device 36 is represented by line 68, and a charging voltage of the second energy storage device 38 is represented by line 70. The preferred range of the operating state of charge of the first energy storage device 36 is generally shown at 72, and the preferred range of the operating state of charge of the second energy storage device 38 is generally shown at 74. Within FIG. 2, the 50% SOC of the second energy storage device 38 is generally shown by the reference point 76. The 90% SOC of the first energy storage device 36 is generally shown by the reference point 78. The difference between the first open circuit voltage 64 of the first energy storage device 36 at the 50% SOC 76 and the second open circuit voltage 66 of the second energy storage device 38 at the 90% SOC 78 is generally shown between reference lines by the dimension 80. As noted, the difference 80 is equal to at least 10 mV, but is no more than 1000 mV. Accordingly, as noted above, the second open circuit voltage 66 of the second energy storage device 38 at a 50% SOC 76 is at least 10 mV greater than the first open circuit voltage 64 of the first energy storage device 36 at 90% SOC 78, and is no more than 1000 mV greater than the first open circuit voltage 64 of the first energy storage device 36.

FIG. 2 also shows that the second charging voltage 70 of the second energy storage device 38 over the preferred range of the operating state of charge (e.g., 30% to 70%) of the second energy storage device 38, is less than the first charging voltage 68 of the first energy storage device 36 over the same state of charge range (i.e., 30% to 70%), so that the second energy storage device 38 may accept most of the charging current from the motor-generator 26, even if both the first energy storage device 36 and the second energy storage device 38 are connected in parallel when the first switch 40 is disposed in the first closed state and the second switch 42 is disposed in the second closed state.

The first auxiliary electric system 28, i.e., the voltage sensitive auxiliary electric system 28, is disposed in a parallel electrical relationship with both the first energy storage device 36 and the second energy storage device 38. The first auxiliary electric system 28 includes at least one electric component that operates with an allowable voltage fluctuation of equal to or less than a predetermined value (e.g., one volt). For example, the first auxiliary electric system 28 may include incandescent headlights, auxiliary motors, entertainment system components, that are sensitive to excessive voltage fluctuations that are greater than the predetermined value (e.g., 1 volt). The first auxiliary electric system 28 may include a first master switch 39 that is operable to connect and disconnect the first auxiliary electric system 28 from the electrical circuit 24.

A first switch 40 is disposed within the electrical circuit 24 between the first energy storage device 36 and the first auxiliary electric system 28. The first switch 40 is not disposed between the first energy storage device 36 and the starter mechanism 32. As such, the first switch 40 does not need to be sized to carry the cranking current used to operate the starter mechanism 32. A second switch 42 is disposed within the electrical circuit 24 between the second energy storage device 38 and the first auxiliary electric system 28. The first auxiliary electric system 28 is disposed within the electrical circuit 24, between the first switch 40 and the second switch 42. The second switch 42 is not disposed between the second energy storage device 38 and the motor-generator 26. As such, the second switch 42 does not need to be sized to carry the current between the second energy storage device 38 and the motor-generator 26.

Figure 3:
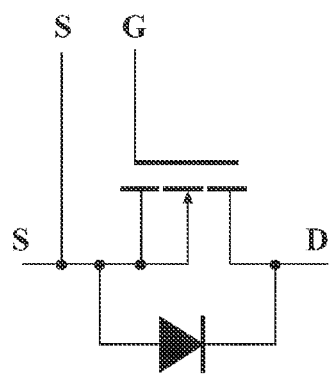
FIG. 3 is a schematic drawing of a uni-directional current blocking switch.
Figure 4:
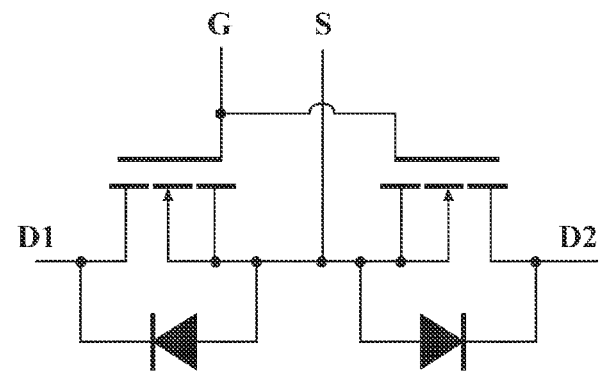
FIG. 4 is a schematic drawing of a bi-directional current blocking switch.

The first switch 40 may include, but is not limited to, a uni-direction current blocking switch or a bi-direction current blocking switch. A schematic example of a uni-direction current blocking switch is shown in FIG. 3, and a schematic example of a bi-direction current blocking switch is shown in FIG. 4. Within FIGS. 3 and 4, the label "S" indicates a source, the label "G" indicates a gate, and the label "D" indicates a drain, as is commonly understood by those skilled in the art. The first switch 40 includes a first open state and a first closed state. When the first switch 40 is the preferred embodiment of the uni-direction current blocking switch, such as shown in FIG. 3, and is disposed in the first open state, the first switch 40 is operable to conduct an electrical current in only a first direction 44 48 when the voltage of the first energy storage device 36 exceeds that across the first auxiliary electric system 28. When the first switch 40 is a uni-direction current blocking switch, and is disposed in the first closed state, the first switch 40 is operable to conduct an electrical current in either the first direction 44 48 or a second direction 46 50. The second direction 46 50 is opposite to the first direction 44 48. As used herein, the first direction 44 48 of the first switch 40 is defined as the direction of an electrical current flowing from the first energy storage device 36 to the first auxiliary electric system 28. The first switch 40 may include, but is not limited to, one of a MOSFET (metal oxide semiconductor field effect transistor), a Wide Ban Gap switch such as a GaNFET (gallium nitride field effect transistor), a SiCFET (silicon carbide field effect transistor), an electro-mechanical relay with a diode across it, or some other similar device capable of selectively blocking current in one direction when open and allowing current in a second, opposite direction when the voltage of the first energy storage device 36 exceeds that across the first auxiliary electric system 28 and allowing current in both directions when the switch is selected to be in the first closed state.

The second switch 42 may include, but is not limited to, a bi-direction current blocking switch, such as shown in FIG. 4. The second switch 42 includes a second open state and a second closed state. When disposed in the second open state, the second switch 42 is operable to prevent an electrical current in both a first direction 44 48 and a second direction 46 50. The second direction 46 50 is opposite the first direction 44 48. As used herein, the second direction 46 50 of the second switch 42 is defined as the direction of an electrical current flowing from the second energy storage device 38 to the first auxiliary electric system 28. When disposed in the second closed state the second switch 42 is operable to conduct an electrical current in either the first direction 44 48 or the opposite second direction 46 50. The second switch 42 may include, for example, a pair of MOSFETs (metal oxide semiconductor field effect transistors) or Wide Ban Gap switches such as a GaNFETs (Gallium nitride field effect transistors), SiCFETS (Silicon carbine field effect transistors) connected in series opposition, an electro-mechanical relay or some other similar device capable of selectively blocking current in both directions when in the second open state. Similarly, a bidirectional current blocking switch may be employed as the first switch 40 as well, in case the first switch 40 needs to block current flow in the first direction 44, 48 when in the first open state. The first switch 40 may need to block current flow in the first direction 44, 48 when in the first open state if there is any fault in the first auxiliary electric system 28 causing an overload of the first switch 40 during the first open state, or to prevent any current from being drawn from the first energy storage device 36 when the second energy storage device 38 is also connected to the first auxiliary electric system 28 by disposing the second switch 42 in the second closed state.

The first auxiliary electric system 28 is operable to draw no more than a maximum load current. The maximum load current is based on the various different components of the first auxiliary electric system 28, and will vary with different applications. Because the first switch 40 is positioned within the electrical circuit 24 so that the cranking current required to operate the starter mechanism 32 does not need to flow through the first switch 40, the first switch 40 does not need to be sized to carry the cranking current. Rather, the first switch 40 may be sized to conduct an electrical current at least equal to or slightly greater than the maximum load current, but significantly less than the cranking current used to operate the starter mechanism 32.

Because the second switch 42 is positioned within the electrical circuit 24 so that the current between the second energy storage device 38 and the motor generator does not need to flow through the second switch 42, the second switch 42 does not need to be sized to carry the motor-generator 26 current. Rather, the second switch 42 may be sized to conduct an electrical current at least equal to or slightly greater than a sum of the maximum load current of the first auxiliary electric system 28 and a charging current of the first energy storage device 36. The charging current is a current that may be supplied from the second energy storage device 38 or the motor-generator 26 to the first energy storage device 36 for charging the first energy storage device 36 with energy from the second energy storage device 38 or the motor-generator 26. The sum of the maximum load current and the charging current is significantly less than the cranking current used to operate the starter mechanism 32.

For example, the maximum load current may be approximately equal to or less than 150 amps, and the charging current may be approximately equal to or less than 50 amps. An exemplary value of the cranking current may be approximately equal to 900 amps. Accordingly, based on the above noted exemplary embodiments, the first switch 40 may be sized to carry approximately 150 amps, and the second switch 42 may be sized to carry approximately 200 amps.

As noted above, the second energy storage device 38 is connected to the second auxiliary electric system 30, i.e., the non-voltage-sensitive auxiliary electric system 30. The second energy storage device 38 is disposed in a parallel electrical relationship with the second auxiliary electric system 30. The second auxiliary electric system 30 includes at least one electric component that operates with an allowable voltage fluctuation of greater than the predetermined value (e.g., one volt). For example, the second auxiliary electric system 30 may include an electrical device whose change in performance affected by fluctuations in voltage is not readily noticeable by the vehicle customer, such as for example, an electric heater of an HVAC system, an electric heater for an exhaust gas treatment system, a rear defogger, or heated seats. The second auxiliary electric system 30 may include at least one second master switch 52 that is operable to connect and disconnect the second auxiliary electric system 30 from the electrical circuit 24.

The powertrain 20 may further include a battery isolation controller 54 connected to the electrical circuit 24, and operable to control the operation of various components of the electrical circuit 24, such as for example, the first switch 40 and the second switch 42.

The battery isolation controller 54 may be embodied as one or multiple digital computers or host machines each having one or more processors, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and any required input/output (I/O) circuitry, I/O devices, and communication interfaces, as well as signal conditioning buffer and driver electronics.

The computer-readable memory may include any non-transitory/tangible medium which participates in providing data or computer-readable instructions. Memory may be non-volatile or volatile. Non-volatile media may include, for example, optical or magnetic disks and other persistent memory. Example volatile media may include dynamic random access memory (DRAM), which may constitute a main memory. Other examples of embodiments for memory include a floppy, flexible disk, or hard disk, magnetic tape or other magnetic medium, a CD-ROM, DVD, and/or any other optical medium, as well as other possible memory devices such as flash memory.

The battery isolation controller 54 includes tangible, non-transitory memory on which are recorded computer-executable instructions, including a switch control algorithm. The processor of the battery isolation controller 54 is configured for executing the switch control algorithm. The switch control algorithm implements a method of isolating the first energy storage device 36 and/or the second energy storage device 38 from each other and/or the first auxiliary electric system 28. The battery isolation controller 54 which of a plurality of different operating modes to configure the electrical circuit 24, and signals the various components of the electrical circuit 24 to position them appropriately for the selected operating mode.

The electrical circuit 24 is configurable to operate in an auto-jump-charging mode. When operating in the auto-jump-charging mode, the first switch 40 is disposed in the first closed state and the second switch 42 is disposed in the second closed state to allow the charging current from the second energy storage device 38 to charge the first energy storage device 36. The charging inrush current flowing between the first energy storage device 36 and the second energy storage device 38 may be limited by operating either the first switch 40 and/or the second switch 42 for a limited time in a linear mode where the first switch 40 and the second switch 42 operate with a higher resistance than in the normally closed state. The first auxiliary electric system 28 may be optionally disconnected from the electric circuit by disconnecting the first master switch 39. In so doing, if the stored energy of the first energy storage device 36 is not sufficient to supply the cranking current for the time required to start the engine 22, then the first energy storage device 36 may be charged from energy stored in the second energy storage device 38. Once the first energy device is sufficiently charged, the electrical circuit 24 may be configured in a starting mode to start the engine 22.

The electrical circuit 24 is configurable to operate in a normal jump-charging mode when both the energy storage devices 36 and 38 have insufficient energy to crank the engine. When operating in the normal jump-charging mode, the first switch 40 is disposed in the first open state and the second switch 42 is disposed in the second open state to allow an external charging device such as a garage charger or a tow-truck or another vehicle battery to be connected directly across the first energy storage device 36. The first auxiliary electric system 28 will be disconnected from the electric circuit by disconnecting the master switch 39. In case the first energy storage device 36 is a lead acid battery (as it is in the preferred embodiment), it may be charged from the external charging device including double battery for fast jump starts from trucks that have 24V nominal voltage. Keeping the second switch 42 in the second open state prevents higher voltage such as 24V during the double battery jump starts from damaging the second energy storage device 38, especially in the case that the second energy storage device 38 is of a Li-Ion and ultra-capacitor type storage device.

When the electrical circuit 24 is configured to operate in the starting mode, the second switch 42 is positioned in the second closed state and the first switch 40 is positioned in the first open state to block the starting current from flowing from the second energy storage device 38 to the first energy storage device 36. Once the second switch 42 is positioned in the second closed state, the first energy storage device 36 may be connected to the starter mechanism 32, such as by example, through the starting switch 34, to provide power to the starter mechanism 32 at the cranking current. The voltage drop across the first energy storage device 36 due to the high cranking current is not experienced at the first auxiliary electric system 28 due to the second energy storage device 38 supporting the first auxiliary electric system 28 with stable voltage.

When the electrical circuit 24 is configured to operate in the power assist mode, the first switch 40 is positioned in the first closed state and the second switch 42 is positioned in the second open state to block the current from flowing from the first energy storage device 36 to the second energy storage device 38 and maintain a stable voltage across the first auxiliary electrical system 28. Once the first switch 40 is positioned in the first closed state and the second switch 42 is positioned in the second open state, the motor-generator may be controlled as a motor using the DC-AC inverter to provide torque assist to the engine using power drawn from the second energy storage device 38. The voltage drop across the second energy storage device 38 during this motoring operation of the motor-generator 26 is not experienced at the first auxiliary electric system 28 due to the closed first switch 40 connecting the first energy storage device 36 across the first auxiliary electric system 28 and the open second switch 42 isolating the second energy storage device 38 from the first auxiliary electric system 28.

When the electrical circuit 24 is configured to operate in the regeneration or energy recuperation mode, the first switch 40 is positioned in the first closed state and the second switch 42 may be positioned in the second open state to block the current from flowing from the second energy storage device 38 to the first energy storage device 36 and maintain a stable voltage across the first auxiliary electrical system 28. Once the first switch 40 is positioned in the first closed state and the second switch 42 is positioned in the second open state, the motor-generator 26 may be controlled as a generator using the DC-AC inverter in reverse to generate electrical power to charge the second energy storage device 38 and supply power to the second auxiliary electrical system 30. The voltage rise across the second energy storage device 38 during this charging operation by the motor-generator 26 is not experienced at the first auxiliary electrical system 28 due to the closed first switch 40 connecting the first energy storage device 36 across the first auxiliary electric system 28 and the open second switch 42 isolating the second energy storage device 38 from the first auxiliary electric system 28.

The electrical circuit 24 may be configured to operate in a charge balance mode where the first switch 40 is positioned in the first closed state and the second switch 42 is positioned in the second closed state to allow current from flowing from the second energy storage device 38 and/or from the motor-generator 26 to the first energy storage device 36 to restore charge on the first energy storage device 36 lost during autostarts and the support of the first auxiliary electrical system 28 when the second switch 42 was open during power assist or energy recuperation modes.

Under steady driving conditions, or once the charge restoration of the first energy storage device 36 is complete, the electrical circuit 24 may be configured to operate in a cruise mode, wherein the second switch 42 is positioned in the second closed state and the first switch 40 is positioned in the first open state to block any current from flowing from the first energy storage device 36 to the first auxiliary electric system 28, as the voltage of the second energy saving device 38 is greater than that of the first energy storage device 36. Supporting the first auxiliary electric system 28 with energy from the second energy storage device 38 allows use of the recuperated energy to sustain the electrical loads without use of engine power to generate electric power, thereby saving fuel. By using bidirectional current blocking switch as the first switch 40, it is possible to allow the second energy saving device 38 to continue to discharge to a voltage lower than that of the first energy storage device 36 if the characteristics of the two energy storage devices so require, to reuse a maximum amount of the energy stored in the second energy storage device 38 during the recuperation mode.

The electrical circuit 24 may also be configured to operate in a key-off mode. When configured to operate in the key-off mode, the second switch 42 is disposed in the second open state to block an electrical current between the second energy storage device 38 and the first auxiliary electric system 28, such that the first energy storage device 36 provides an electrical current to power the first auxiliary electric system 28.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A powertrain for a vehicle, the powertrain comprising:
   an engine;
   an electrical circuit including:
      a motor-generator coupled to the engine, and operable as either a motor to provide power to the engine, or as a generator to generate an electrical current from power supplied from the engine;
      a starter mechanism coupled to the engine and operable to start the engine from a cranking current;
      a first energy storage device disposed in a parallel electrical relationship with the starter mechanism, and operable to supply the cranking current to the starter mechanism;
      a second energy storage device disposed in a parallel electrical relationship with the motor-generator, and operable to receive a current from the motor-generator, or provide a current to the motor generator;
      a first auxiliary electric system disposed in a parallel electrical relationship with both the first energy storage device and the second energy storage device;
      a first switch disposed within the electrical circuit between the first energy storage device and the first auxiliary electric system;
      a second switch disposed within the electrical circuit between the second energy storage device and the first auxiliary electric system;
      wherein the first auxiliary electric system is disposed within the electrical circuit between the first switch and the second switch; and
      wherein the first energy storage device is operable to store a first amount of charge and provide short bursts of power within a first amperage range over a first temperature range, and wherein the second energy storage device is operable to store a second amount of charge and provide short bursts of power at a second amperage over a second temperature.

2. The powertrain set forth in claim 1 wherein the first energy storage device and the second energy storage device each operate at a substantially identical voltage.

3. The powertrain set forth in claim 2 wherein the first energy storage device and the second energy storage device each operate nominally over a range of approximately 10 to 16 volts.

4. The powertrain set forth in claim 1 wherein the first switch is a uni-direction blocking switch having a first open state and a first closed state, wherein the first switch is operable to conduct an electrical current in only a first direction when disposed in the first open state, and wherein the first switch is operable to conduct an electrical current in either the first direction or an opposite second direction when disposed in the first closed state.

5. The powertrain set forth in claim 4 wherein the first direction of the first switch is defined as the direction of an electrical current flowing from the first energy storage device to the first auxiliary electric system.

6. The powertrain set forth in claim 1 wherein the first switch is a bi-direction blocking switch having a first open state and a first closed state, wherein the first switch is operable to prevent an electrical current in both a first direction and an opposite second direction when disposed in the first open state, and wherein the first switch is operable to conduct an electrical current in either the first direction or the opposite second direction when disposed in the first closed state.

7. The powertrain set forth in claim 1 wherein the second switch is a bi-direction blocking switch having a second open state and a second closed state, wherein the second switch is operable to prevent an electrical current in both a first direction and an opposite second direction when disposed in the second open state, and wherein the second switch is operable to conduct an electrical current in either the first direction or the opposite second direction when disposed in the second closed state.

8. The powertrain set forth in claim 7 wherein the second direction of the second switch is defined as the direction of an electrical current flowing from the second energy storage device to the first auxiliary electric system.

9. The powertrain set forth in claim 1 wherein the first amount of charge of the first energy storage device is greater than the second amount of charge of the second energy storage device, the first amperage range of the first energy storage device is greater than the second amperage range of the second energy storage device, and wherein the first temperature range over which the first energy storage device is operable to provide power is greater than the second temperature range over which the second energy storage device is operable to provide power.

10. The powertrain set forth in claim 1 wherein the first energy storage device is a lead acid battery.

11. The powertrain set forth in claim 1 wherein the second energy storage device is one of a Li-Ion battery or an ultra-capacitor.

12. The powertrain set forth in claim 1 wherein the first energy storage device includes a first open circuit voltage at a first operating state of charge, and the second energy storage device includes a second open circuit voltage at a second operating state of charge, and wherein the second open circuit voltage of the second energy storage device is greater than the first open circuit voltage of the first energy storage device.

13. The powertrain set forth in claim 12 wherein the second open circuit voltage of the second energy storage device at the second operating state of charge is at least 10 mV greater than the first open circuit voltage of the first energy storage device at the first operating state of charge, and wherein the second open circuit voltage is no more than 1000 mV greater than the first open circuit voltage of the first energy storage device at the first operating state of charge.

14. The powertrain set forth in claim 13 wherein the operating state of charge of the first energy storage device is between 80% and 95%, and wherein the operating state of charge of the second energy storage device is between 30% and 80%.

15. The powertrain set forth in claim 14 wherein the first energy storage device includes a first charging voltage at the second operating state of charge, and the second energy storage device includes a second charging voltage at the second operating state of charge, and wherein the second charging voltage of the second energy storage device at the second operating state of charge is less than the first charging voltage of the first energy storage device at the second operating state of charge.

16. The powertrain set forth in claim 1 wherein the first auxiliary electric system is operable to draw no more than a maximum average load current, and wherein the first switch is operable to conduct an electrical current at least equal to or greater than the maximum average load current.

17. The powertrain set forth in claim 16 wherein the maximum average load current is less than the cranking current.

18. The powertrain set forth in claim 16 wherein the second switch is operable to conduct at least the maximum average load current and a charging current for charging the first energy storage device with the second energy storage device.

19. The powertrain set forth in claim 18 wherein the sum of the maximum average load current and the charging current is less than the cranking current.

20. The powertrain set forth in claim 1 further comprising a second auxiliary electric system disposed in a parallel electrical relationship with the second energy storage device.

21. The powertrain set forth in claim 20 wherein the first auxiliary electric system includes at least one electric component that operates with an allowable voltage fluctuation of equal to or less than a first predetermined value.

22. The powertrain set forth in claim 21 wherein the second auxiliary electric system includes at least one electric component that operates with an allowable voltage fluctuation of greater than a second predetermined value.

23. The powertrain set forth in claim 1 wherein the electrical circuit is operable in an auto-jump-charging mode, wherein the first switch is disposed in a first closed state and the second switch is disposed in a second closed state to allow a charging current from the second energy storage device to charge the first energy storage device.

24. The powertrain set forth in claim 1 wherein the electrical circuit is operable in a normal jump-charging mode, wherein the first switch is disposed in a first open state and the second switch is disposed in a second open state to allow a charging current from an external device to charge the first energy storage device while preventing voltages higher than the maximum rated voltage of the second energy storage device from reaching the second energy storage device.

25. The powertrain set forth in claim 1 wherein the electrical circuit is operable in a starting mode, wherein the first energy storage device is providing power to the starter mechanism at the cranking current, and the first switch is disposed in a first open state to block the starting current between the first energy storage device and the second energy storage device, and the second switch is disposed in a second closed state to maintain stable voltage across the first auxiliary electric system.

26. The powertrain set forth in claim 1 wherein the electrical circuit is operable in a key-off mode, wherein the second switch is disposed in a second open state to block an electrical current between the second energy storage device and the first auxiliary electric system, and the first switch is disposed in a first closed state such that the first energy storage device provides an electrical current to the first auxiliary electric system.

27. The powertrain set forth in claim 1 wherein the electrical circuit is operable in a power assist mode, wherein the first switch is disposed in a first closed state and the second switch is disposed in a second open state to block an electrical current flowing from the first energy storage device to the second energy storage device and maintain a stable voltage across the first auxiliary electric system, while the motor-generator is operating as a motor.

28. The powertrain set forth in claim 1 wherein the electrical circuit is operable in an energy recuperation mode, wherein the first switch is disposed in a first closed state and the second switch is disposed in a second open state to block an electrical current flowing from the second energy storage device to the first energy storage device and maintain a stable voltage across the first auxiliary electric system, while the motor-generator is operating as a generator.

29. The powertrain set forth in claim 1 wherein the electrical circuit is operable in a charge balancing mode, wherein the first switch is disposed in a first closed state and the second switch is disposed in a second closed state to allow an electrical current flowing from either the second energy storage device or the motor-generator to the first energy storage device to restore charge on the first energy storage device.

30. The powertrain set forth in claim 1 wherein the first switch is not disposed, within the electrical circuit, between the first energy storage device and the starter mechanism, such that first switch does not have to carry the cranking current used to operate the starter mechanism, and wherein the second switch is not disposed, within the electrical circuit, between the second energy storage device and the motor-generator, such that the second switch does not have to carry a current between the second energy storage device and the motor-generator.

* * * * *